United States Patent
Yoshida et al.

(10) Patent No.: US 7,859,241 B2
(45) Date of Patent: Dec. 28, 2010

(54) PHOTOVOLTAIC POWER GENERATION CONTROLLER AND POWER EVALUATION METHOD IN PHOTOVOLTAIC POWER GENERATION CONTROL

(75) Inventors: Toshiya Yoshida, Tokyo (JP); Katsumi Ohniwa, Tokyo (JP); Michio Ohtsubo, Tokyo (JP)

(73) Assignee: Tokyo Denki University, Tokyo (JP)

( * ) Notice: Subject to any disclaimer, the term of this patent is extended or adjusted under 35 U.S.C. 154(b) by 359 days.

(21) Appl. No.: 12/191,900

(22) Filed: Aug. 14, 2008

(65) Prior Publication Data

US 2009/0115393 A1    May 7, 2009

(30) Foreign Application Priority Data

Nov. 7, 2007    (JP) .............................. 2007-289858

(51) Int. Cl.
G05F 1/56    (2006.01)
(52) U.S. Cl. ....................... 323/285; 323/906
(58) Field of Classification Search .................. 323/234, 323/265, 271, 282, 283, 285, 286, 300, 906; 320/140, 166
See application file for complete search history.

(56) References Cited

U.S. PATENT DOCUMENTS

| | | | |
|---|---|---|---|
| 5,654,883 A * | 8/1997 | Takehara et al. | 363/79 |
| 6,169,678 B1 * | 1/2001 | Kondo et al. | 363/71 |
| 6,590,793 B1 * | 7/2003 | Nagao et al. | 363/95 |
| 7,269,036 B2 * | 9/2007 | Deng et al. | 363/49 |
| 7,768,244 B2 * | 8/2010 | Perol | 323/234 |
| 2004/0207366 A1 * | 10/2004 | Sung | 320/140 |
| 2005/0105224 A1 * | 5/2005 | Nishi | 361/18 |
| 2006/0055366 A1 * | 3/2006 | Tsunetsugu et al. | 320/101 |
| 2006/0132102 A1 * | 6/2006 | Harvey | 320/166 |
| 2007/0137688 A1 * | 6/2007 | Yoshida | 136/244 |
| 2008/0203994 A1 * | 8/2008 | Park | 323/318 |

(Continued)

FOREIGN PATENT DOCUMENTS

JP    H09-91050    4/1997

OTHER PUBLICATIONS

Takahara, et al., "Maximum Power Control for a Photovoltaic Power Generation System by Adaptive Hill-Climbing Method", *T.IEE Japan*, vol. 121-D, No. 6, pp. 689-694, 2001.

*Primary Examiner*—Adolf Berhane
(74) *Attorney, Agent, or Firm*—Foley & Lardner LLP

(57) ABSTRACT

A photovoltaic power generation controller, in which minute power change is detected even with a low-resolution AD converter, thereby being capable of performing maximum power point tracking control with high accuracy, is provided. In the photovoltaic power generation controller of the invention, a control circuit 44 shifts switches 41 to respective output A sides of a voltage detector 8 and a current detector 9; gives a low-frequency ripple component to an operating voltage of a solar cell 1 while increasing modulation factor D by predetermined variation width d, to start maximum power point search from an open circuit voltage side; confirms a maximum power point passage when: an operating point oscillates in the vicinity of the maximum power point; and a power value, which is output by a power detector 43, after update of the modulation factor becomes smaller than a power value before update of the modulation factor; and switches the switches 41 to respective output sides of amplifiers 23 and 24 to continue the maximum power point tracking control.

10 Claims, 8 Drawing Sheets

U.S. PATENT DOCUMENTS

2008/0278983 A1* 11/2008 Park ............................ 363/95
2009/0079385 A1* 3/2009 Xiao et al. .................. 320/102
2010/0156185 A1* 6/2010 Kim et al. ..................... 307/72

* cited by examiner

FIG.4

TABLE 1 : RATING OF SOLAR CELL

| Rated maximum power | 50 [W] |
|---|---|
| Rated voltage at the maximum power | 15.9 [V] |
| Rated current at the maximum power | 3.15 [A] |
| Rated open circuit voltage | 19.8 [V] |
| Rated short circuit current | 3.45 [V] |

(a)

(b)

(c)

PHOTOVOLTAIC POWER GENERATION CONTROLLER AND POWER EVALUATION METHOD IN PHOTOVOLTAIC POWER GENERATION CONTROL

CROSS-REFERENCES TO RELATED APPLICATIONS

The entire disclosure of Japanese Patent Application No. 2007-289858, filed on Nov. 7, 2007, is expressly incorporated herein by reference.

BACKGROUND

1. Technical field

The present invention relates to a photovoltaic power generation controller and a power evaluation method in photovoltaic power generation control.

2. Related Art

In order to take power efficiently from a solar cell, the solar cell always needs to be made to operate at the maximum power point (MPP). Therefore, a general photovoltaic power generation system is provided with a maximum power point tracking control circuit (MPPT).

Many types of MPPT methods have already been reported, and one of those is a control method referred to as a hill-climbing method. In this control method, an oscillation component (hereinafter referred to as a "ripple component") with a constant variation width is given to an operating voltage of a solar cell at a low frequency, using a power converter such as a chopper circuit; and the resultant inclination of power is calculated; and the operating point is moved to MPP. This control method has high adaptability with respect to changes in the external environment, and so is utilized widely.

In this hill-climbing method, improvement in the tracking speed to reach the MPP and output power oscillation suppression after MPP convergence have a trade-off relationship. An adaptive hill-climbing method in which: a variation width is automatically adjusted to have the optimum value to realize prompt tracking to MPP; and at the same time, oscillation in the vicinity of MPP is suppressed, has been proposed to overcome the above problem (Takahara, Yamanouchi, Kawaguchi, "Maximum Power Acquisition Control of Photovoltaic Power Generation System with Adaptive Hill-Climbing Method," Trans.Inst. Elect.Engnr. Jpn. D, vol. 121, no. 6, pp. 689-693, 2001—non-patent document 1). In hill-climbing methods including this adaptive hill-climbing method, the variation width needs to be made as small as possible in order to raise MPPT accuracy after convergence at MPP. However, when conducting a hill-climbing method using a microcomputer (hereinafter referred to as an "MC"), a variation width for a ripple component needs to be determined in consideration of the resolution of an AD converter (hereinafter abbreviated as "ADC"). Many ADCs mounted in inexpensive MCs each have a low resolution and much internal noise, and have no expected accuracy. Therefore, a high-solution ADC is required to decrease variation width to raise the MPPT accuracy of after MPP convergence in the hill-climbing method, but this leads to an increase in product cost.

Meanwhile, in many MPPT control circuits not only employing a hill-climbing method but also other methods, MPPT accuracy deteriorating during periods of low solar radiation is known. In general, when selecting parameters for a control circuit, those parameters are selected in accordance with the maximum rating of a solar cell to be used. However, the output of a solar cell varies greatly with changes in the external environment, so the signal level input to the control circuit is reduced greatly during periods of low solar radiation. Therefore, control accuracy deteriorates due to ADC resolution problems, etc.

In order to detect minute output change by means of an ADC with a low resolution, detecting a voltage and a current of a solar cell with high gains is sufficient. However, when gains are increased, not only ripple components of the current and voltage but also the direct-current components thereof expand, leading to the problem of saturation in a measuring system.

From the above, with attention focused on the feature of a hill-climbing method in which MPPT is performed by evaluating a power change deriving from a ripple component, raising a gain of only the ripple component remaining after removing the direct-current component can be considered. However, when power is calculated from the current and voltage from which direct-current components have been removed, the resultant power completely differs from an original power value generated by a solar cell.

The inventors of the present application found conditions under which MPPT control can be performed accurately even in the case of removing direct-current components, and also found that by employing those conditions, correct power evaluation can be conducted, in the vicinity of MPP, only with ripple components even in the case of completely removing direct-current components. Only ripple components remaining after removing direct-current components reduces the risk of saturation of an amplifier, so the gain of the ripple component can be raised very high, whereby a minute power change can be detected with an ADC having a low resolution. By utilizing this, the accuracy of MPPT can be raised, and the accuracy during periods of low solar radiation can be improved.

Conventional MPPT control techniques in photovoltaic power generators are disclosed in, e.g., JP2005-070890 A (patent document 1) and JP09-091050A (patent document 2). However, those techniques do not include a technique, like the one described above, in which: direct-current components are removed or suppressed in the vicinity of MPP; direct-current ripples are used; and switching gains are switched, thereby attaining an increase in accuracy of MPPT and an improvement in the accuracy during periods of low solar radiation.

SUMMARY

The present invention has been made with the above-described technical background, and therefore has an object to provide a photovoltaic power generation control technique in which switching to power evaluation only with ripple components remaining after removing direct-current components is employed in the vicinity of MMP, whereby an amplifier with an extremely high gain can be used for MPPT control, leading to high-accuracy MPPT covering a wide range of solar radiation amounts.

The basic principle of the invention is as follows. Detecting only ripple components of a voltage and a current of a solar cell to perform maximum power point tracking control (MPPT) is discussed below. Here, the conditions under which correct power evaluation can be conducted when removing direct-current components are clarified theoretically.

Assuming that an output current containing a ripple component with respect to an output voltage $e$ of a solar cell can be represented by $i(e)$, output power can be expressed as follows.

[Expression 1]

$$p(e) = ei(e) \quad (1)$$

In a conventional control method, MPPT is performed by evaluating the above power. Meanwhile, when power evaluation is conducted after removing direct-current values (E, I) (E and I have arbitrary values) respectively from e and i(e), the resultant output power is as follows.

[Expression 2]

$$p'(e) = (e-E)(i(e)-I) = ei(e) - (Ei(e) + eI) + EI \quad (2)$$

When comparing expression 1 with expression 2, it is found that the second and third terms have been added to a right side of expression 2. In an MPPT method, in which comparison of power size is conducted to search for the maximum power point, as in a hill-climbing method, an absolute value of power is not necessarily measured. Therefore, if the second and third terms on the right side of expression 2 each are zero or a constant, MPPT can be performed also by evaluating p'(e). The third term on the right side is obviously a constant. Therefore, MPPT can be performed with p'(e) if conditions in which the second term on the right side is a constant or zero are set.

When assuming that: the changes of e and i(e) are minute; and di/de here is set as α (α is always negative because of the characteristics of a solar cell), in a minute variation period, output current i(e) can be expressed by the following approximate expression.

[Expression 3]

$$i(e) \approx \alpha e + \beta \quad (3)$$

When expression 3 is substituted for the second term on the right side of expression 2,

[Expression 4]

$$Ei(e) + eI = E\alpha e + E\beta + eI \quad (4)$$

the expression above is obtained. Here, when direct-current values E and I are defined based on the relationship of expression 5,

[Expression 5]

$$\frac{I}{E} = -\alpha \quad (5)$$

expression 4 can be considered to express a constant as shown below.

[Expression 6]

$$E\alpha e + E\beta + eI \approx E\beta \quad (6)$$

More specifically, if E and I are selected to satisfy the relationship in expression 5, the second term of expression 2 can be regarded as a constant. Therefore, MPPT can be performed using expression 2 also, in the same way it can be performed using expression 1.

Generally, in the vicinity of the maximum power point, MPP, the following expression is obtained.

[Expression 7]

$$\frac{di(e)}{de} = -\frac{i(e)}{e} \quad (7)$$

Therefore, where an operating point exists in the vicinity of MPP, and direct-current components $E_Q$, $I_Q$ in the vicinity of MPP are selected for E and I (note that $E_Q \approx E_{opt}$ (maximum power voltage), $I_Q \approx I_{opt}$ (maximum power current)), the following expression is obtained.

[Expression 8]

$$\frac{I}{E} = \frac{I_Q}{E_Q} \approx -\alpha \quad (8)$$

Accordingly,

[Expression 9]

$$p'(e) = (e - E_Q)(i(e) - I_Q) \quad (9)$$

MPPT can be performed with expression 9. $(e-E_Q)$ and $(i(e)-I_Q)$ represent only ripple components of a voltage and a current, so it turns out that only measuring the ripple components is sufficient.

Direct-current components can completely be removed in the vicinity of MPP; however, at the other operating points, the direct-current voltage value E and the direct-current current value I, which can be removed depending on the operating point, need to be controlled. However, the operating point at which accuracy needs to be raised is one in the vicinity of MPP, and therefore, the present invention is used only in the vicinity of MPP. When direct-current components are removed, the signal level degrades significantly, so a measurement system is not saturated even when a gain is increased. In short, increasing a gain and raising the accuracy of MPPT both can be attained.

The present invention is a photovoltaic power generation controller in which the above principle is utilized, characterized by including: a solar cell generating electric power via reception of light; a power converter converting power generated by the solar cell to a predetermined power form; a control circuit controlling a modulation factor for the power converter; a voltage detector detecting an output voltage of the solar cell; a current detector detecting an output current of the solar cell; a high-pass filter removing direct-current components of the voltage detector and the current detector; amplifiers respectively amplifying voltage output and current output from the high-pass filter; switches switching between output signals from the voltage detector and the current detector and respective output signals from the amplifiers to conduct signal output; and a power detector obtaining a power value from the voltage signal and the current signal that are output via the switches and inputting the power value to the control circuit, in which the control circuit shifts the switches to respective output sides of the voltage detector and the current detector; performs maximum power point tracking control in which: the power value is observed while varying the modulation factor, to search for an operating point at which the power value is maximum; and then shifts the switches to respective output sides of the amplifiers to continue the maximum power point tracking control.

Also, in the above photovoltaic power generation controller of the invention, the following can be achieved: change of the modulation factor in the control circuit is made discrete;

and a variation width for the modulation factor for the case where the switches are set to the output sides of the amplifiers is made smaller than a variation width for the modulation factor for the case where the switches are set to the output sides of the voltage detector and the current detector.

Also, in the above photovoltaic power generation controller of the invention, the following can be achieved: the power converter is a DC-DC converter converting the power generated by the solar cell to predetermined direct-current power; and the control circuit controlling, as the modulation factor, a modulation factor for the DC-DC converter: shifts the switches to respective output sides of the voltage detector and the current detector; gives a low-frequency ripple component to an operating voltage of the solar cell while increasing the modulation factor by a predetermined variation width to start maximum power point search from an open circuit voltage side; confirms a maximum power point passage when: an operating point oscillates in the vicinity of the maximum power point; and a power value, which is output by the power detector, after update of the modulation factor becomes smaller than a power value before update of the modulation factor; and shifts the switches to respective output sides of the amplifiers to continue the maximum power point tracking control.

Also, in the above photovoltaic power generation controller of the invention, the following can be achieved: the control circuit starts the maximum power point search with a predetermined first variation width first, and after the maximum power point passage, continues the maximum power point tracking control with a second variation width smaller than the first variation width.

Also, in the above photovoltaic power generation controller of the invention, the following can be achieved: an offset setting unit, which measures a voltage, a current, and an inclination on voltage-current characteristics and creates a current offset and a voltage offset accordingly, is provided; and the control circuit adds the current offset created by the offset setting unit to the current, adds the voltage offset created by the offset setting unit to the voltage, and calculates a power value using a resultant current value and voltage value obtained after addition of the offsets, to perform the maximum power point tracking control. A power evaluation method in the photovoltaic power generation control of the invention is characterized by including a first step of performing maximum power point tracking control in which a modulation factor given to a power converter is varied with respect to a detected power value obtained from an output voltage detection signal and an output current detection signal of a solar cell to search for an operating point at which the power value is maximum; and a second step of, after searching for the operating point at which the power value is maximum in the first step, continuing the maximum power point tracking control of signals obtained by amplifying, with predetermined gains, a ripple voltage signal component and a ripple current signal component that are obtained by removing direct-current components respectively from the output voltage detection signal and the output current detection signal in a high-pass filter.

In the power evaluation method in the photovoltaic power generation control of the invention, the following can be achieved: change of the modulation factor is made discrete; and a variation width for the modulation factor used in the second step is made smaller than a variation width for the modulation factor used in the first step.

Also, in the power evaluation method in the photovoltaic power generation control of the invention, the following can be achieved: in the first step, with respect to the power detection value obtained from the output voltage detection signal and the output current detection signal from the solar cell, a low-frequency ripple component is given to an operating voltage of the solar cell while the modulation factor is increased by a predetermined variation width, to start maximum power point search from an open circuit voltage side; and in the second step, a maximum power point passage is confirmed when: the operating point oscillates in the vicinity of the maximum power point; and a power detection value after update of the modulation factor becomes smaller than a power detection value before update of the modulation factor, and the maximum power point tracking control is continued on the signals obtained by amplifying, with predetermined gains, a ripple voltage signal component and a ripple current signal component obtained by removing direct-current components respectively from the output voltage detection signal and the output current detection signal in the high-pass filter.

Also, in the power evaluation method in the photovoltaic power generation control of the invention, the following can be achieved: the maximum power point search is started with a predetermined first variation width first; and after the maximum power point passage, the maximum power point tracking control is continued with a second variation width smaller than the first variation width.

Also, in the power evaluation method in the photovoltaic power generation control of the invention, the following can be achieved: a voltage, a current, and an inclination on voltage-current characteristics are measured; a current offset and a voltage offset are obtained accordingly; the current offset is added to the current; the voltage offset is added to the voltage; and a power value is calculated using a resultant current value and voltage value obtained after addition of the offsets, to continue the maximum power point tracking control.

According to the photovoltaic power generation control technique of the invention, MPPT control is started while giving a predetermined variation width to a modulation for an electric converter, and switching to power evaluation only with ripple components remaining after removing direct-current components is employed in the vicinity of MMP, whereby an amplifier with an extremely high gain can be used for MPPT control, leading to high-accuracy MPPT covering a wide range of solar radiation amounts. Further, as a result of the above, when performing MPPT using MCs, a minute power change can be detected even with a low-resolution ADC, which enables maximum power point tracking control with high accuracy and also an improvement in accuracy of MPPT during periods of low solar radiation.

Also, in the invention, regarding the variation width given to the modulation factor, MPPT control is started with a first variation width having a relatively large value first, and the MPPT control is continued with a second variation width smaller than the first variation width in the vicinity of MPP. This can attain an increase in speed for attainment of MPP, leading to improved responsibility.

BRIEF DESCRIPTION OF THE DRAWINGS

FIG. 4 is a table showing the rating of a solar cell used in the above embodiments.

FIG. 7 is a diagram showing stationary state electric waves in photovoltaic power generation controllers in a conventional example and the embodiment of the invention, wherein: FIG. 7(a) is a diagram of an electric wave in example 1 (the case where the variation width for a modulation factor is 0.04%) according to a conventional hill-climbing method; FIG. 7(b) is a diagram of an electric wave in example 2 (the case where the variation width for a modulation factor is 2.6%) according to a conventional hill-climbing method; and FIG. 7(c) is a diagram of an electric wave according to a hill-climbing method using the power evaluation method according to an example of the invention (the case where the variation width for a modulation factor in the vicinity of the maximum power point is 0.04%).

FIG. 8 is a graph showing accuracy characteristics of maximum power point tracking control in a low solar radiation area, the control being executed by photovoltaic power generation controllers in a conventional example and the embodiment of the invention, wherein FIG. 8(a) is a graph of an accuracy characteristic in example 3 (the case where the variation width for a modulation factor is 0.8%) according to a conventional hill-climbing method; FIG. 8(b) is a graph of an accuracy characteristic in example 4 (the case where the variation width for a modulation factor is 2.6%) according to a conventional hill-climbing method; and FIG. 8(c) is a graph of an accuracy characteristic according to a hill-climbing method using the power evaluation method in the example of the invention (the case where the variation width for a modulation factor in the vicinity of the maximum power point is 0.04%).

DESCRIPTION OF EXEMPLARY EMBODIMENTS

Embodiments of the present invention will be described in detail with reference to the accompanying drawings.

First Embodiment

Figure 1:
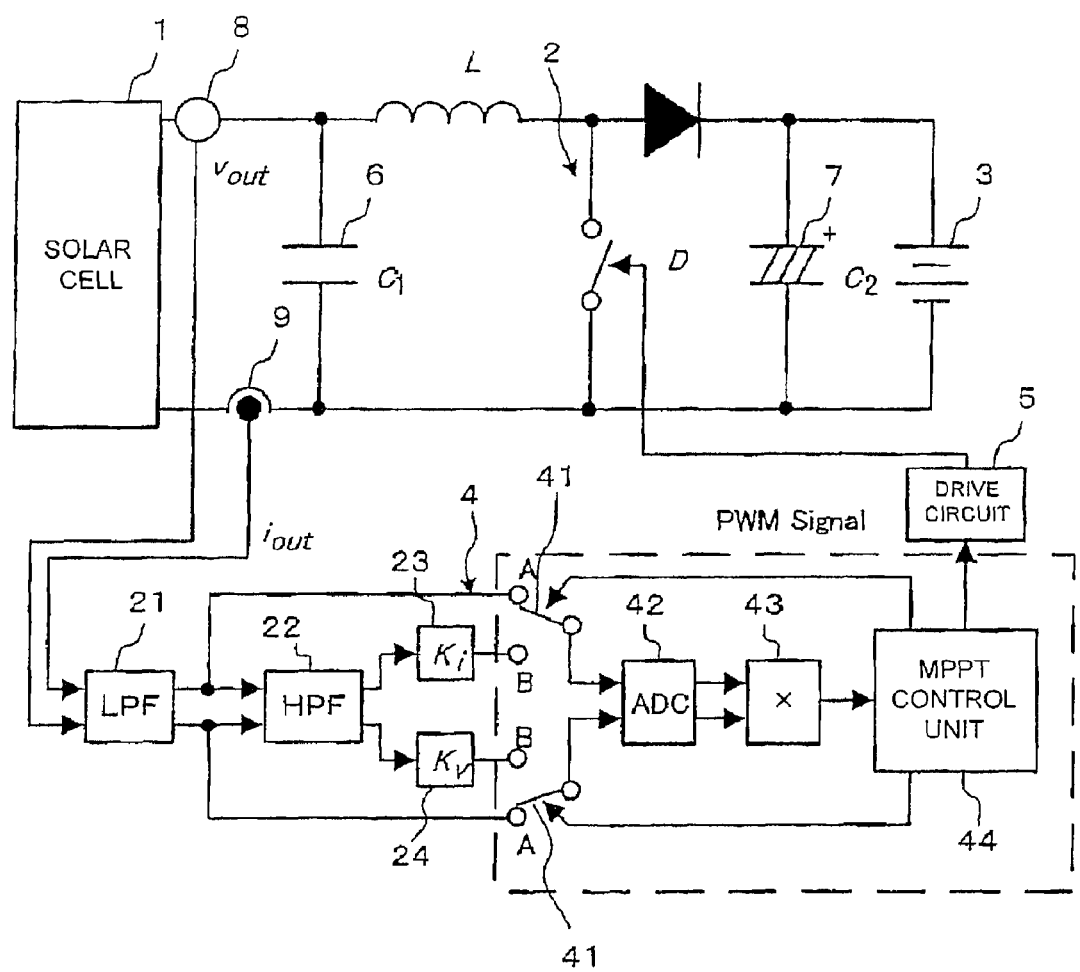
FIG. 1 is a circuit diagram of a photovoltaic power generation controller in a first embodiment of the present invention.

FIG. 1 shows a system configuration of a photovoltaic power generation controller according to a first embodiment of the invention. The photovoltaic power generation controller in this embodiment is composed of a solar cell 1, a step-up chopper circuit 2, a battery 3 serving as a secondary battery as a load, a control circuit 4, and a gate drive circuit 5. A smoothing capacitor 6 is provided between the solar cell 1 and the chopper circuit 2, and a smoothing capacitor 7 is provided between the chopper circuit 2 and the battery 3 that serves as a load. Also, a voltage detector 8 for detecting an output voltage of the solar cell 1 and a current detector 9 for detecting an output current of the solar cell 1 are provided. A detected voltage signal of the voltage detector 8 and a detected current signal of the current detector 9 are input to the control circuit 4 via a low-pass filter (LPF) 21.

The control circuit 4 is provided with a high-pass filter (HPF) 22, a current amplifier 23 with gain coefficient Ki, a voltage amplifier 24 with gain coefficient Kv, switches 41, an AD converter (ADC) 42, a multiplier 43, and an MPPT control unit 44. The switches 41, ADC 42, multiplier 43, and MPPT control unit 44 in the control circuit 4 each employ a single-chip MC.

Operation of the above photovoltaic power generation controller having the above configuration will be described next. In the photovoltaic power generation controller of this embodiment, modulation factor D of the step-up chopper circuit 2 is controlled by the control circuit 4, thereby determining an operating voltage of the solar cell 1. Modulation factor D is varied with constant variation width d, and the operating voltage of the solar cell 1 is given a low-frequency ripple component. The output voltage signal and current signal detected from the solar cell 1 are input to the LPF 21. This is done in order to remove the high-frequency switching ripples generated due to switching of the chopper circuit 2. The HPF 22 is used for removing direct-current components, and obtains $(e-E_Q)$ and $(i(e)-I_Q)$ in the vicinity of MPP. Note that respective cut-off frequencies of the LPF 21 and the HPF 22 have been set so as not to affect the signals of ripple components.

Figure 2:
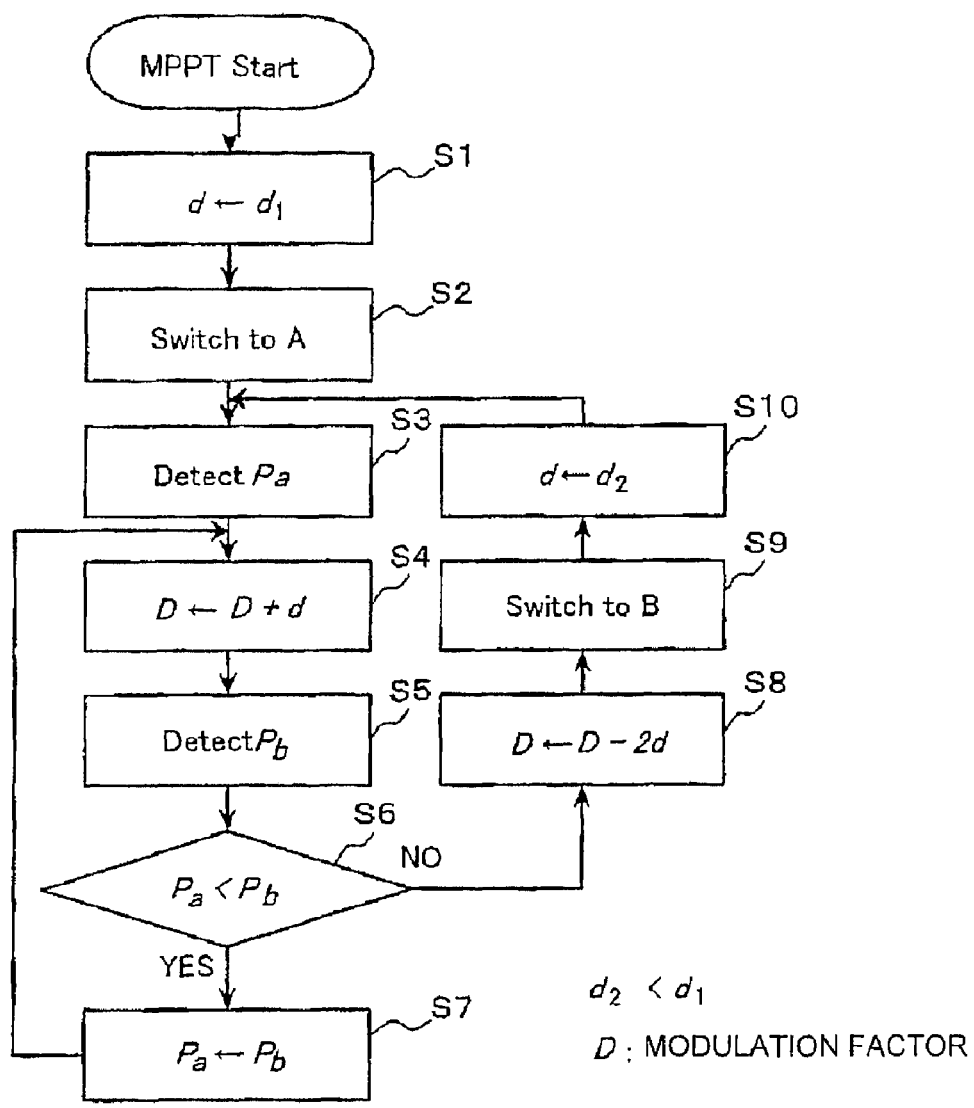
FIG. 2 is a flowchart of maximum power point tracking control performed by a maximum power point tracking control unit according to the first embodiment.

An MPPT algorithm executed by the MPPT control unit 44 is shown in the flowchart of FIG. 2. The basic control algorithm is based on a hill-climbing method. In the flowchart of FIG. 2, variable D represents a modulation factor; d represents a variation width for modulation factor D; Pa represents power before update of the modulation factor; and Pb represents power after update of the modulation factor.

The MPPT control unit 44 starts operation from open circuit voltage Pa after setting the switches 41 to sides A, and searches for MPP using large variation width d1 (steps S1-S7).

If an operating point oscillates in the vicinity of MPP, and power Pb after update of the modulation factor becomes smaller than power Pa before update of the modulation factor, the MPPT control unit 44 follows a branched route for "NO" at step S6, changes modulation factor D back to the previous modulation factor D, and shifts the switches 41 from sides A to sides B (steps S6, S8, and S9). Then, MPPT control unit 44 switches the variation width for modulation factor D from large d1 to small d2, and continues MPPT control (step S10).

In the MPP search, modulation factor D is increased/decreased by fractional variation width d, and if power Pa before update of the modulation factor is smaller than power Pb after update of the modulation factor, the same control is repeated while increasing the modulation factor little by little. If power exceeds the peak, and power Pb after update of the modulation factor becomes smaller than power Pa before update of the modulation factor by increasing modulation factor D by variation width d, maximum power point MPP is regarded as having been passed, and the modulation factor is changed back to modulation factor D-2d. Then, the same control is repeated while increasing modulation factor D a little at a time by smaller variation width d $(=d_2<d_1)$, thereby keeping modulation factor D having a value that effects peak power.

Signal levels degrade significantly after removing direct-current components from the output current and voltage of the solar cell 1 via the HPF 22. However, here in this embodiment, in order to maximize the use of the resolution of the ADC 42, the current and the voltage are respectively multiplied by gain coefficients Ki and Kv to raise the gains to make variation width d smaller. As a result, the accuracy of MPPT can be raised even with a low-resolution MC.

According to this embodiment, the direct-current components of the solar cell 1 are removed, and MPPT is performed only with the ripple components given to evaluate power change. Therefore, an extremely minute power change can be detected even when using the ADC 42 with a low resolution, and also, high MPPT accuracy can be obtained in a wide range of solar radiation amounts. In addition, according to this embodiment, extremely high-accuracy MPPT can be realized with an inexpensive microcomputer having a built-in low-resolution ADC, and this can contribute to a reduction in costs.

Incidentally, in the above embodiment, regarding variation width d given to modulation factor D, $d_1$ having a relatively rough value is used until the attainment of MPP; meanwhile, $d_2$ ($d_2 < d_1$) having a fractional value is used after the attainment of MPP, thereby shortening the time required to attain MPP. However, a constant value may be used for variation width d given to modulation factor D. In this case, control logic is further simplified. Note that, when variation width d is set to be excessively small here, the time required to attain MPP cannot be prevented from becoming longer than that in the above embodiment.

Second Embodiment

Figure 3:
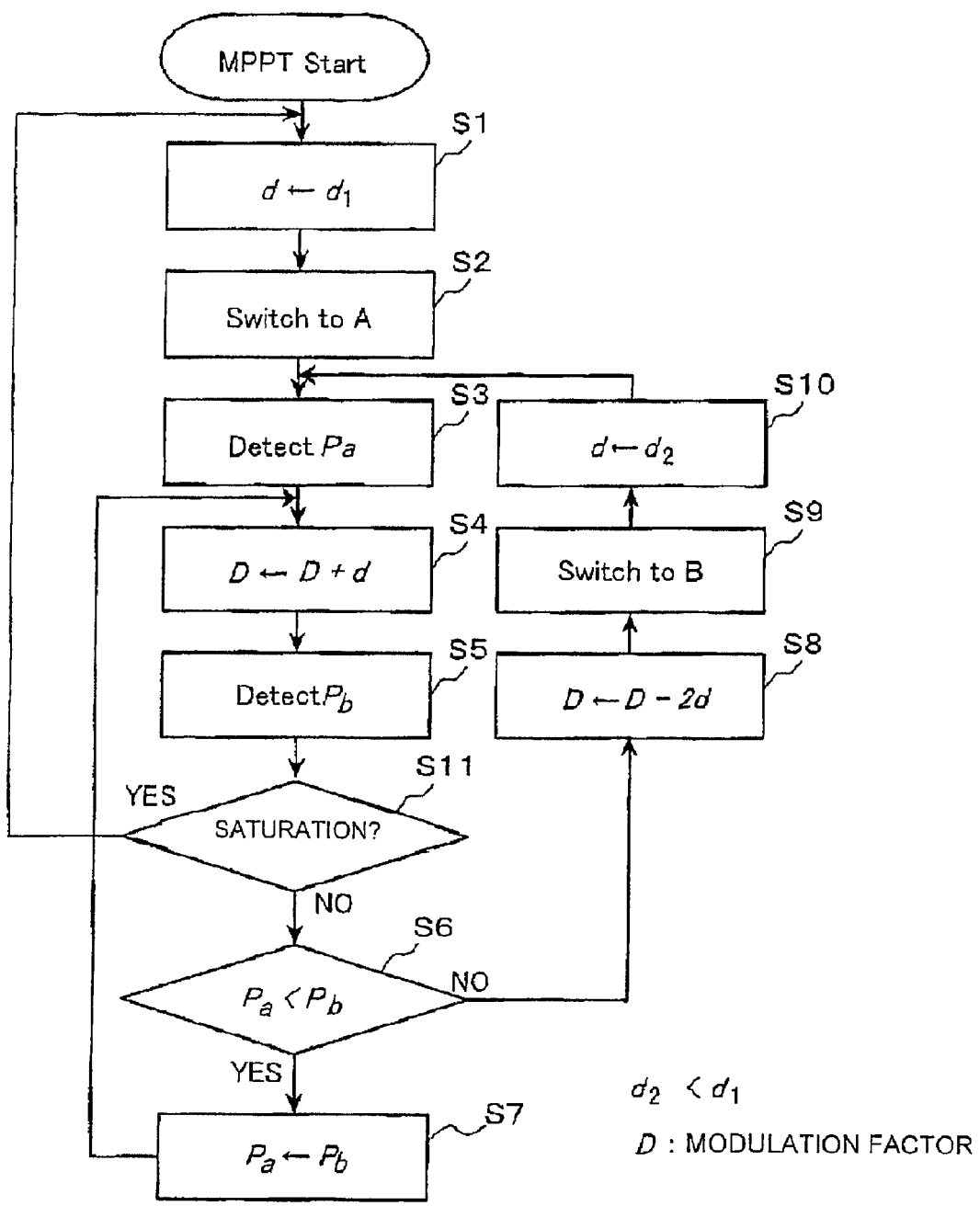
FIG. 3 is a flowchart of maximum power point tracking control conducted by a maximum power point tracking control unit in a photovoltaic power generation controller according to a second embodiment of the invention.

A second embodiment of the invention will be described with reference to FIG. 3. A characteristic of this embodiment resides in that: the MPPT control unit 44 determines the presence of saturation of the amplifiers 23 and 24; and a hill-climbing method is executed again from the beginning in the case of occurrence of saturation, meanwhile, MPPT control is continued with an improved hill-climbing method as in the first embodiment in the case of non-occurrence of saturation. Accordingly, the system configuration of this embodiment is the same as in the first embodiment, but MPPT control is performed according to the flowchart of FIG. 3.

In this embodiment, the MPPT control unit 44 starts operation from open circuit voltage Pa after setting the switches 41 to sides A, and searches for MPP with large variation width $d_1$ (steps S1-S7). Then, the MPPT control unit 44 determines the presence of occurrence of saturation of the amplifiers 23 and 24 based on whether or not the ADC 42 has output digital output having the possible maximum value (step S11). Note that, regarding the determination of occurrence of saturation of the amplifiers 23 and 24, for example, a method of making determination based on whether or not Pa=Pb is obtained for the output of the amplifiers 23 and 24 three times or more in a row may be employed, instead of the above method of detecting saturation of the ADC 42. Also, the above determination of saturation of the ADC 42 does not need to be based on the maximum value able to be output by the ADC 42, and for example, a method of determining saturation under conditions where "90% of the maximum output is exceeded" may be employed. As described above, there are no particular limitations with respect to the saturation occurrence determination method.

If the MPPT control unit 44 determines that there is no occurrence of saturation at step S11, the MPPT control unit 44 continues MPPT control as in the first embodiment. More specifically, if an operating point oscillates in the vicinity of MPP, and power Pb after update of the modulation factor becomes smaller than power Pa before update of the modulation factor, the MPPT control unit 44 follows a branched route for "NO" at step S6, changes modulation factor D back to the previous modulation factor D, and shifts the switches 41 from sides A to sides B (steps S6, S8, and S9). Then, MPPT control unit 44 switches the variation width for modulation factor D from rough d1 to fractional d2, and continues MPPT control (step S10).

Meanwhile, when the MPPT control unit 44 determines that there is a occurrence of saturation at step S11, the MPPT control unit 44 returns to step S1 to change variation width d for modulation factor D back to $d_1$ having a larger value, and continues the hill-climbing method (steps S11, S1).

According to this embodiment, when saturation occurs by switching variation width d for modulation factor D to $d_2$ having a smaller value, recovery from the saturation can automatically be achieved by changing variation width d back to $d_1$ having a large value to restart MPPT.

Note that, in both the embodiments above, the gains of the amplifiers 23 and 24 can be set fifty-sixty fold to five hundred-six hundred fold. Also, the method for MPPT control is not limited to the hill-climbing method. For example, various maximum value search methods using a genetic algorithm or similar can also be utilized.

For a power converter, not only the DC-DC converters including the chopper circuit 2 shown in the above embodiments but also an inverter that converts direct-current power of photovoltaic generation to alternating-current power to interconnect with an alternating-current power system can be employed.

Furthermore, in the above embodiments, in MPPT control, MPP search is performed while increasing the modulation factor by a constant variation width; however, the MPPT control method is not limited to this. For example, a method of performing MPPT control while reducing a modulation factor, and a method of performing MPPT control while oscillating a modulation factor may also be employed. Moreover, instead of the hill-climbing method, a method of moving an operating point in a wide range to measure power, thereby finding the maximum power point as a result, may also be employed.

More specifically, the characteristic of the invention resides in MPPT control being performed, in the vicinity of MMP, using the power values obtained from the detected current signal and detected voltage signal that have passed through the high-pass filter 22, and the method for MPPT itself is not limited. Also, similar MPPT control can be performed not using the ADC 42, but using an analog circuit.

Third Embodiment

A third embodiment of the invention will be described. When assuming that di/de, i.e., α is known at an arbitrary operating point of a voltage-current characteristic of the solar cell 1, MPPT control can be performed also with the power value obtained from the product of the values obtained by, as shown in expression 2, subtracting E and I, which satisfy the relationship in expression 5, respectively from the measurement values of a voltage and a current.

The case where power is calculated by removing direct-current components when the operating point is represented by ($E_p$, $I_p$) is considered. Removing the direct-current components with a high-pass filter corresponds to employing the following expressions in expression 2,

[Expression 10]

$$E = E_p \qquad (10)$$

[Expression 11]

$$I = I_p \qquad (11)$$

Meanwhile, when removing $E_p$ from a voltage value, value I that can be subtracted from a current value is expressed by the following expression based on expression 5.

[Expression 12]

$$I = -\alpha E_p \qquad (12)$$

When ($E_p$, $I_p$) exists in the vicinity of MPP, the value of expression 12 and the value of expression 11 are almost equal to each other because of the relationship of expression 8. However, those values are not equal to each other at the points not in the vicinity of MPP, and so correct MPPT control cannot be performed with the power obtained from expression 2. More specifically, this means that the value subtracted from the current value, i.e., the value of expression 11 is not appropriate. In light of the above, when measuring the values of voltage and current that have passed through the high-pass filter, direct-current current value $I_p$, which has been removed in the high-pass filter, is added inside the MC, and then the appropriate value given by expression 12 is subtracted from the relevant current value, whereby the relationship of expression 5 can be kept. As a result, MPPT control can be performed based on the power of expression 2. Here, it is assumed that the voltage and current of the solar cell from which direct-current values have been removed are expressed by the following expressions.

[Expression 13]

$\tilde{e}, \tilde{i}$

[Expression 14]

$$p' = \tilde{e}(\tilde{i} + I_p + \alpha E_p) \quad (13)$$

Then, MPPT control can be performed by using the power value given by expression 13 above. More specifically, it is sufficient that: the offset expressed by $I_p + \alpha E_p$ is added to the current, from which the direct-current value has been removed; and the resultant value is multiplied by the relevant voltage value.

Conversely, when removing $I_p$ from the current value, value E that can be subtracted from the voltage value is expressed by the following expression.

[Expression 15]

$$E = -\frac{1}{\alpha} I_p \quad (14)$$

At this point,

[Expression 16]

$$p' = \left(\tilde{e} + E_P + \frac{1}{\alpha} I_p\right) \times \tilde{i} \quad (15)$$

MPPT control can be performed by using the power value given by the above expression. More specifically, it is sufficient that the offset expressed by $E_p + (1/\alpha)I_p$ is added to the voltage value, from which the direct-current value has been removed; and the resultant value is multiplied by the current value.

As described above, even in the case of the operating point not being in the vicinity of MPP, the offset in accordance with inclination α of a voltage-current characteristic to the voltage/current value, whereby MPPT control can be performed with the power obtained via the high-pass filter. Note that $E_p$ and $I_p$ can be measured by setting the switches to sides A in FIG. 1. In this case, the resolution of the A/D converter is not high, but approximate $E_p$ and $I_p$ can be found. Also, inclination α can be obtained with high accuracy by measuring that inclination while conducting oscillation with the switches set to side B.

Figure 5:
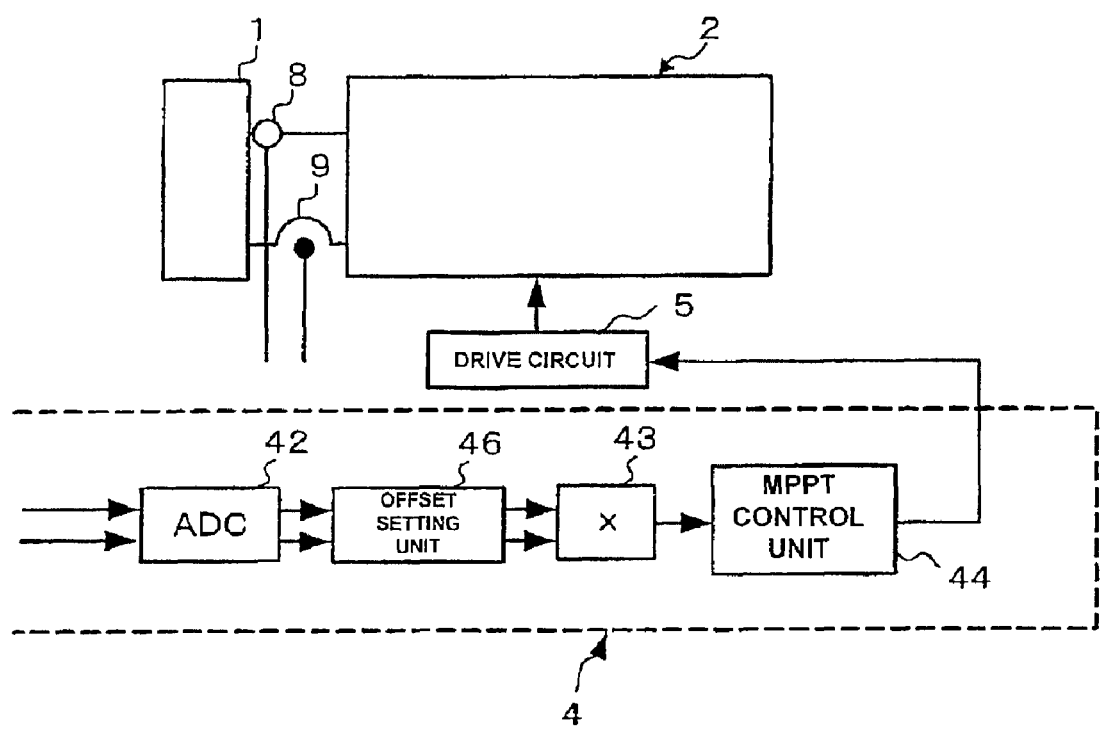
FIG. 5 is a block diagram of a photovoltaic power generation controller according to a third embodiment of the invention.
Figure 6:
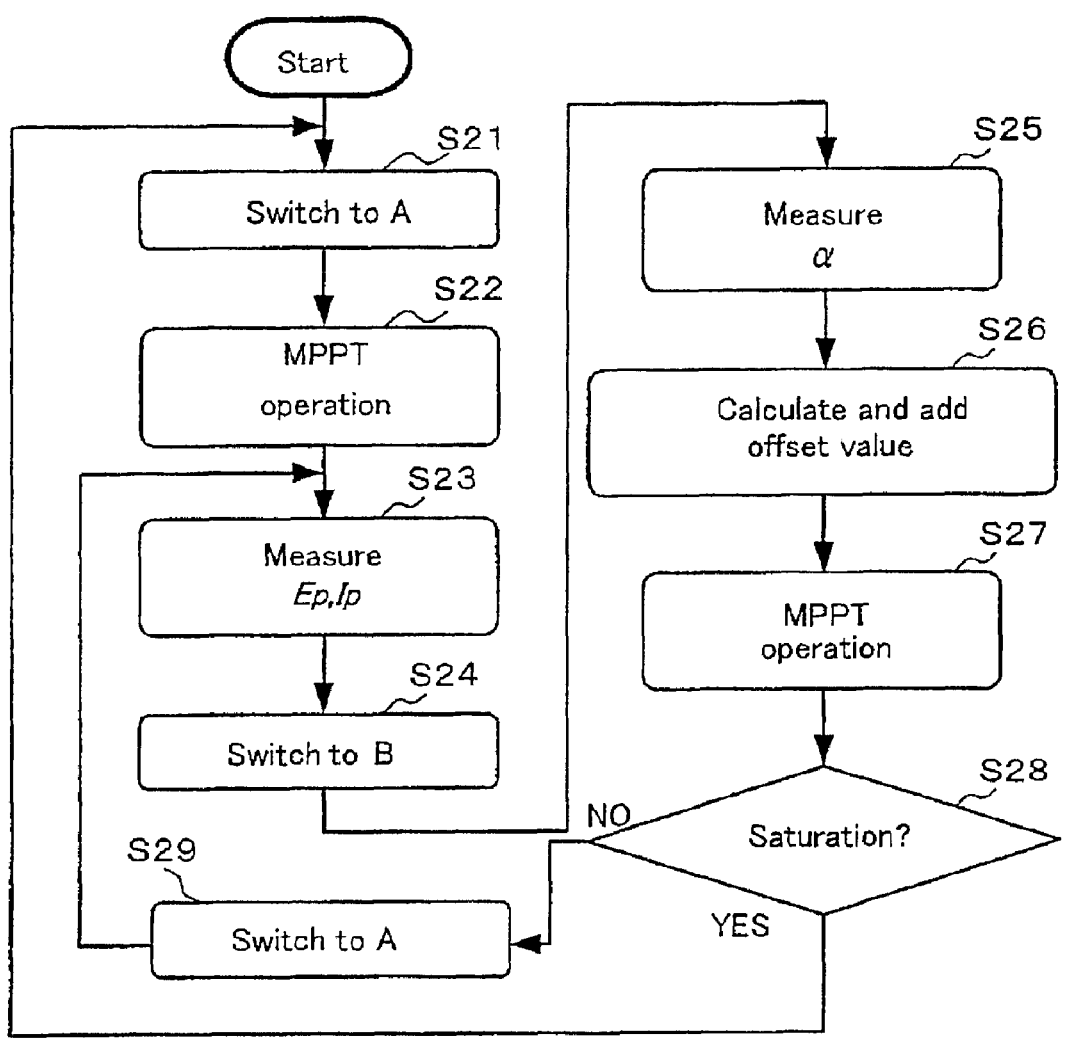
FIG. 6 is a flowchart of maximum power point tracking control performed by a maximum power point tracking control unit in the photovoltaic power generation controller according to the third embodiment of the invention.

FIG. 5 is a block diagram of a photovoltaic power generation controller of the third embodiment, and FIG. 6 is a flowchart of maximum point tracking control performed by the photovoltaic power generation controller in this embodiment. The photovoltaic power generation controller in this embodiment has a characteristic that an offset setting unit 46 for calculating current and voltage offset values and adding those values is provided between the ADC 42 and the multiplier 43. In FIG. 5, from among the other elements, the same elements as those of the first embodiment in FIG. 1 are denoted by the same reference numerals.

As shown in the flowchart of FIG. 6, in the photovoltaic power generation controller of this embodiment, conventional MPPT control is performed with the switches 41 set to sides A (without a high-pass filter, low gain), and after convergence, voltage value $E_p$ and current $I_p$ value at the current operating point are obtained (steps S21-S24).

Next, the switches 41 are set to side B (with a high-pass filter, high gain), and inclination α is measured with high accuracy (steps S24 and S25). Offset values are calculated based on voltage value $E_p$, current value $I_p$, and α, which are obtained above, and the offset values are set in the offset setting unit 46 (step S26). Then, power is calculated using those offset values in the multiplier 43, as in the first embodiment, and MPPT control is continued (steps S27-S29 and S23). As a result, highly accurate MPPT control can be attained.

When the above-described saturation occurs in the ADC 42 during this MPPT control, the switches 41 are switched to sides A again, and the above procedure will be repeated (YES at step S28, and steps S21-S27).

EXAMPLES

Experimental results obtained using the photovoltaic power generation controller in this embodiment will be described next. Usability of a power evaluation method conducted by the photovoltaic power generation controller in this embodiment was confirmed based on comparison with a conventional hill-climbing method. An experimental apparatus having the FIG. 1 configuration was used. Table 1 in FIG. 4 shows the rating of the solar cell used in experiments. H8/3052F was used as for the MCs in the control circuit 4. An ADC having a 10-bit resolution incorporated in an MC was used as the ADC 42, but only high-order 8 bits are referred to in order to conduct verification with an ADC with a lower resolution. The output voltage and current detected from the solar cell 1 were subjected to scaling so that the rated open circuit voltage and short circuit current fell within the input voltage range of the ADC 42. Regarding the ripple component for power evaluation, a ripple component at a low frequency was selected to avoid the influence of removal of switching ripples (switching frequency 10 kHZ). The update period for modulation factor D was set to 10 ms.

Note that, in the experiments, an incandescent lamp was used as a light source in order to obtain reproducibility, and the relevant lamp voltage VL was recorded.

Comparison of Electric Waveforms in Stationary State

In this experiment, verification was conducted regarding whether or not stable control can be performed when conducting switching to the power evaluation method according to this embodiment after the convergence to the maximum power point. A given solar radiation amount and a given temperature were used as measurement conditions.

Figure 7:
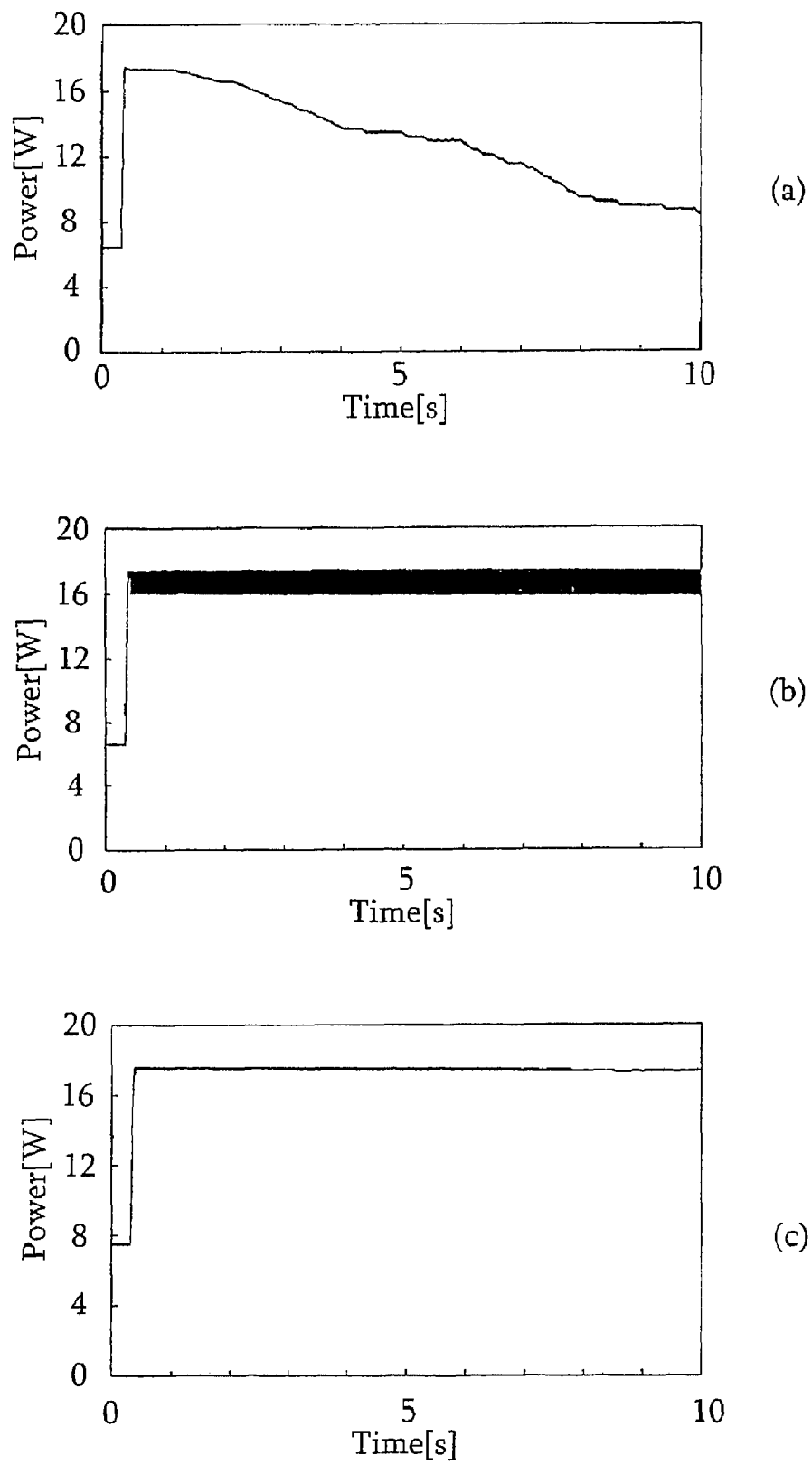

FIG. 7 shows electric waveforms after convergence to the maximum power point. FIG. 7(a) shows an electric waveform obtained when a variation width for a modulation factor is set to 0.04% after MPP convergence in a conventional hill-climbing method. 1LSB of an 8-bit ADC accounts for about 0.39% of a full-scale, and it is impossible for control to be performed because a power change relative to the set variation width cannot be evaluated accurately.

FIG. 7(b) shows an electric waveform obtained when a variation width for a modulation factor is set to 2.6%. A power change can be detected sufficiently with an 8-bit ADC, and therefore, stable convergence in the vicinity of the maximum power point is attained. However, the variation width has been set 65-fold compared with that in FIG. 7(a), so large power oscillation occurs after convergence is reached, which leads to power loss of about 3% relative to the maximum power on static characteristics in a stationary state.

FIG. 7(c) shows the result of performing MPPT after convergence to the maximum power point in this embodiment under the same condition as that in FIG. 7(a). According to this embodiment, the gain of the ripple component is raised to the extent that a power change can be detected with the resolution of the ADC used in the experiment. Therefore, stable convergence to the maximum power point and almost no occurrence of power oscillation could be confirmed.

Comparison of MPPT Accuracy in Wide Range of Irradiance

In this embodiment, comparison of MPPT accuracy was compared over a wide range of solar radiation amounts between the hill-climbing method using the power evaluation method of the embodiment and a conventional method, and the usability was verified. Note that the parameters for the experimental system were selected to be optimal at a rated maximum output. However, only about a third part of the power at a rated maximum output was generated with the light source used in the experiment, so the experimental result is one obtained in the case of a low solar radiation area. However, MPPT accuracy decreases in low solar irradiation areas, so an evaluation covering this range of solar radiation amounts was enough. The surface temperature was fixed at 50°.

Figure 8:
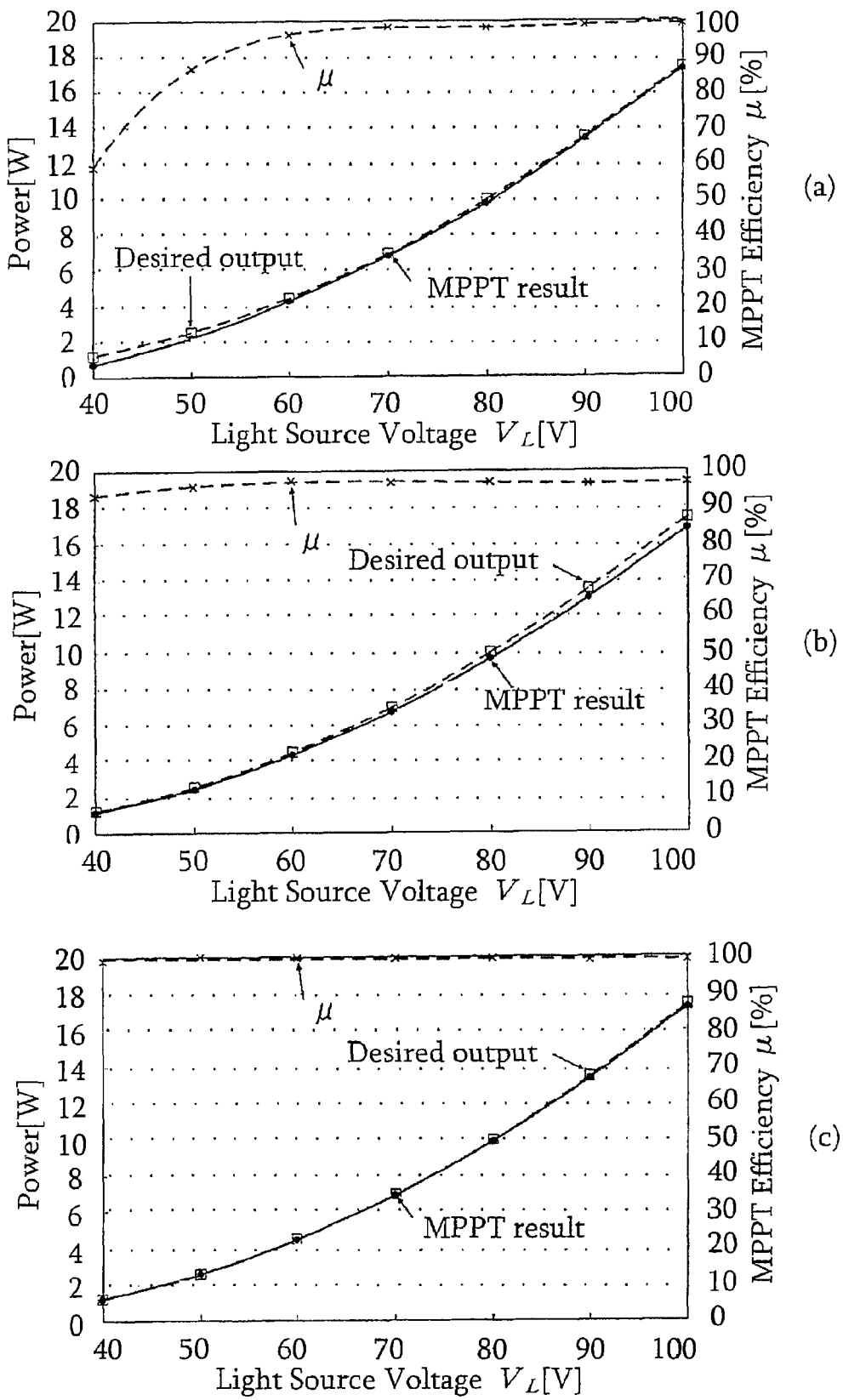

FIG. 8 shows the results of MPPT in a low solar radiation area. The desired output shown in each of FIGS. 8A to 8C is the maximum power on static characteristics under the relevant measurement condition. MPPT efficiency μ shows what amount of power could be collected with respect to a desired output, which indicates the accuracy of MPPT. FIG. 8(a) shows the case of setting a variation width (0.8%) for a modulation factor with which MPPT can be performed stably during periods of high solar radiation with a relatively little amount of power oscillation in a stationary state using a conventional hill-climbing method. It was found that extremely high MPPT efficiency is obtained during periods of high solar radiation; meanwhile, the MPPT accuracy degrades as solar radiation decreases. This is because a power change cannot be evaluated accurately since the levels of the output voltage and current signals detected from the solar cell 1 degrade significantly during periods of low solar radiation.

FIG. 8(b) shows the MPPT result for the case with a variation width set to 2.6%. This result derives from 3.25-fold increase in the variation width in FIG. 8(a), which enables power change detection during periods of low solar radiation. The result shows that the MPPT efficiency during periods of low solar radiation rose; meanwhile, the MPPT efficiency during periods of high solar radiation decreased by about 3% because the variation width was increased.

FIG. 8(c) shows the result of MPPT conducted with a variation width of 0.04% according to the embodiment of the invention. The gain of the ripple component was increased even during periods of low solar radiation, so extremely high MPPT efficiency was attained. Also, it can be found that an almost desired output can be obtained because of a little amount of oscillation of the ripple component even during periods of high solar radiation.

From the above experimental results, it was demonstrated that the photovoltaic power generation controller of the invention can attain high MPPT accuracy over a wide range of solar radiation amounts.

What is claimed is:

1. A photovoltaic power generation controller, comprising:
    a solar cell generating electric power via reception of light;
    a power converter converting power generated by the solar cell to a predetermined power form;
    a control circuit controlling a modulation factor for the power converter;
    a voltage detector detecting an output voltage of the solar cell;
    a current detector detecting an output current of the solar cell;
    a high-pass filter removing direct-current components of the voltage detector and the current detector;
    amplifiers respectively amplifying voltage output and current output from the high-pass filter;
    switches switching between output signals from the voltage detector and the current detector and respective output signal from the amplifiers to conduct signal output; and
    a power detector obtaining a power value from the voltage signal and the current signal that are output via the switches and inputting the power value to the control circuit,
    wherein the control circuit shifts the switches to respective output sides of the voltage detector and the current detector; performs maximum power point tracking control in which: the power value is observed while varying the modulation factor, to search for an operating point at which the power value is maximum; and then shifts the switches to respective output sides of the amplifiers to continue the maximum power point tracking control.

2. The photovoltaic power generation controller according to claim 1, wherein in the control circuit, change of the modulation factor is made discrete, and a variation width for the modulation factor for the case where the switches are set to the output sides of the amplifiers is made smaller than a variation width for the modulation factor for the case where the switches are set to the output sides of the voltage detector and the current detector.

3. The photovoltaic power generation controller according to claim 1, wherein:
    the power converter is a DC-DC converter converting the power generated by the solar cell to predetermined direct-current power;
    the control circuit controlling, as the modulation factor, a modulation factor for the DC-DC converter: shifts the switches to respective output sides of the voltage detector and the current detector; gives a low-frequency ripple component to an operating voltage of the solar cell while increasing the modulation factor by a predetermined variation width to start maximum power point search from an open circuit voltage side; confirms a maximum power point passage when: an operating point oscillates in the vicinity of the maximum power point; and a power value, which is output by the power detector, after update of the modulation factor becomes smaller than a power value before update of the modulation factor; and shifts the switches to respective output sides of the amplifiers to continue the maximum power point tracking control.

4. The photovoltaic power generation controller according to claim 3, wherein the control circuit starts the maximum power point search with a predetermined first variation width first, and after the maximum power point passage, continues the maximum power point tracking control with a second variation width smaller than the first variation width.

5. The photovoltaic power generation controller according to claim 1, further comprising an offset setting unit measuring a voltage, a current, and an inclination on voltage-current characteristics and creating a current offset and a voltage offset accordingly, wherein the control circuit adds the current offset created by the offset setting unit to the current, adds the voltage offset created by the offset setting unit to the voltage, and calculates a power value using a resultant current value and voltage value obtained after addition of the offsets, to perform the maximum power point tracking control.

6. A power evaluation method in photovoltaic power generation control, comprising:

a first step of performing maximum power point tracking control in which a modulation factor given to a power converter is varied with respect to a detected power value obtained from an output voltage detection signal and an output current detection signal of a solar cell to search for an operating point at which the power value is maximum; and a second step of, after searching for the operating point at which the power value is maximum in the first step, continuing the maximum power point tracking control of signals obtained by amplifying, with predetermined gains, a ripple voltage signal component and a ripple current signal component that are obtained by removing direct-current components respectively from the output voltage detection signal and the output current detection signal in a high-pass filter.

7. The power evaluation method in photovoltaic power generation control according to claim 6, wherein change of the modulation factor is made discrete, and a variation width for the modulation factor used in the second step is made smaller than a variation width for the modulation factor used in the first step.

8. The power evaluation method in photovoltaic power generation control according to claim 6, wherein:

in the first step, with respect to the power detection value obtained from the output voltage detection signal and the output current detection signal from the solar cell, a low-frequency ripple component is given to an operating voltage of the solar cell while the modulation factor is increased by a predetermined variation width, to start maximum power point search from an open circuit voltage side; and in the second step, a maximum power point passage is confirmed when: the operating point oscillates in the vicinity of the maximum power point; and a power detection value after update of the modulation factor becomes smaller than a power detection value before update of the modulation factor, and the maximum power point tracking control is continued on the signals obtained by amplifying, with predetermined gains, a ripple voltage signal component and a ripple current signal component obtained remaining after removing direct-current components in the high-pass filter.

9. The power evaluation method in photovoltaic power generation control according to claim 8, wherein the maximum power point search is started with a predetermined first variation width first, and after the maximum power point passage, the maximum power point tracking control is continued with a second variation width smaller than the first variation width.

10. The power evaluation method in photovoltaic power generation control according to claim 6, wherein: a voltage, a current, and an inclination on voltage-current characteristics are measured; a current offset and a voltage offset are obtained accordingly; the current offset is added to the current; the voltage offset is added to the voltage; and a power value is calculated using a resultant current value and voltage value obtained after addition of the offsets, to continue the maximum power point tracking control.

* * * * *

UNITED STATES PATENT AND TRADEMARK OFFICE
CERTIFICATE OF CORRECTION

PATENT NO.            : 7,859,241 B2                                    Page 1 of 1
APPLICATION NO.       : 12/191900
DATED                 : December 28, 2010
INVENTOR(S)           : Yoshida et al.

It is certified that error appears in the above-identified patent and that said Letters Patent is hereby corrected as shown below:

In Column 2, Line 53, delete "MMP," and insert -- MPP, --, therefor.

In Column 3, Line 28, delete "dilde" and insert -- di/de --, therefor.

In Column 3, Line 59, delete "(b 6)" and insert -- (6) --, therefor.

In Column 6, Line 39, delete "MMP," and insert -- MPP, --, therefor.

In Column 7, Line 41, delete "DESCRIPTION" and insert -- DETAILED DESCRIPTION --, therefor.

In Column 10, Line 33, delete "MMP," and insert -- MPP, --, therefor.

In Column 13, Lines 57-58, delete "in crease" and insert -- increase --, therefor.

Signed and Sealed this
Twenty-fourth Day of April, 2012

David J. Kappos
*Director of the United States Patent and Trademark Office*